June 27, 1939.   S. B. GRIMSON   2,164,062
DIFFRACTION METHOD OF AND APPARATUS FOR COLOR PHOTOGRAPHY
Filed Nov. 26, 1937   2 Sheets-Sheet 1

INVENTOR.
Samuel B. Grimson
BY
Darby & Darby
ATTORNEYS.

June 27, 1939.    S. B. GRIMSON    2,164,062
DIFFRACTION METHOD OF AND APPARATUS FOR COLOR PHOTOGRAPHY
Filed Nov. 26, 1937    2 Sheets—Sheet 2

INVENTOR.
Samuel B. Grimson
BY
Danby & Danby
ATTORNEYS.

Patented June 27, 1939

2,164,062

UNITED STATES PATENT OFFICE 2,164,062

DIFFRACTION METHOD OF AND APPARATUS FOR COLOR PHOTOGRAPHY

Samuel B. Grimson, New York, N. Y., assignor to Color Research Corporation, New York, N. Y., a corporation of Delaware Application November 26, 1937, Serial No. 176,440

3 Claims. (Cl. 95—2)

This invention is particularly concerned with improvements in the apparatus and methods of color photography, particularly of the type disclosed in the copending application of Samuel B. Grimson and Leo Lipp, Serial No. 156,046, filed July 28, 1937 for Diffraction method of and apparatus for color photography.

An object of this invention is to provide an apparatus and method of employing tri-color banded filters in which the color combination are duplicated one or more times.

A further object of the invention involves the use of filters of tri-color bands arranged in multiple series to smooth out the tinting thrown on the film by a single series of color bands, and so to secure a better overall color distribution in the photographic images obtained.

A still further object of the invention involves the use of multiple series filters of this type to permit of a greater spacing between the diffraction grating used and the film.

A still further object of the invention involves the use of multiple series filters of this type to permit each color area of the film to receive light from two or more separated portions of the color filter, and thus reduce the effect of fringing due to space parallax.

These as well as other objects are successfully secured by means of the invention herein disclosed, as will be apparent from the following disclosure.

This invention resides substantially in the combination, construction, arrangement and relative location of parts, the steps and series of steps, all as will be carefully explained below.

The invention herein disclosed may be termed an improvement upon the method disclosed in the co-pending application Serial No. 156,046 mentioned above, in which is disclosed a method of producing a three color separation negative and a screen plate positive film therefrom. In general the improvement on that method herein disclosed involves the use of three-color banded filters in which the color bands are duplicated one or more times in conjunction with a diffraction grating whereby the color tints thrown on the film are more evenly distributed giving an even white field, the elimination of noticeable fringing due to space parallax by exposing the film through different spaced portions of the filter, and lengthening the focal distance of the filter from the diffraction grating to the film.

Figure 2:
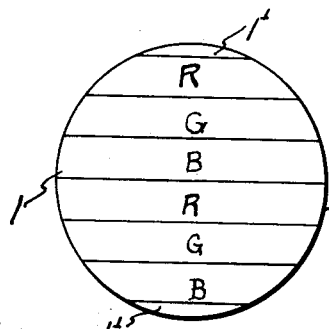
Figure 2 is an elevational view of a three-color filter in which the three primary colors thereof are duplicated once.
Figure 3:
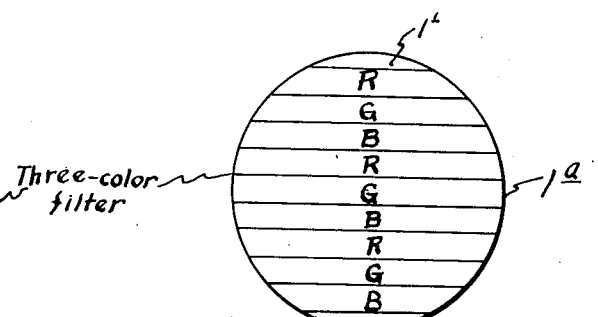
Figure 3 is a similar view of a three color filter in which the primary colors have been duplicated twice.

In accordance with the general nature of this invention to produce a three-color separation negative on a black and white film, the ordinary motion picture camera is employed in conjunction with a three-color filter in which the colors are duplicated one or more times and a diffraction grating which may be incorporated in the camera and which needs no special manipulation. Such an arrangement has been diagrammatically illustrated in Fig. 1. At 2 is diagrammatically shown the usual lens system of a camera, such as a motion picture camera, in front of which, between it and the scene to be photographed, is placed the three-color filter 1. This filter, as illustrated in Fig. 2, consists of a series of regularly repeating color bands of red, green and blue. In the case of the filter illustrated in Fig. 2, each color band has been duplicated once. These filters may, of course, be made in any suitable manner and in accordance with known practice and are preferably, as illustrated, divided into bands of uniform color. The extreme upper and lower portions of the filters illustrated in Figs. 2 and 3 are masked off as indicated at 1' in each case, in any suitable manner, so as to constrict the light transmitting portions of the upper and lower portions of the filters to bands equal to the width of the other color bands.

Figure 4:
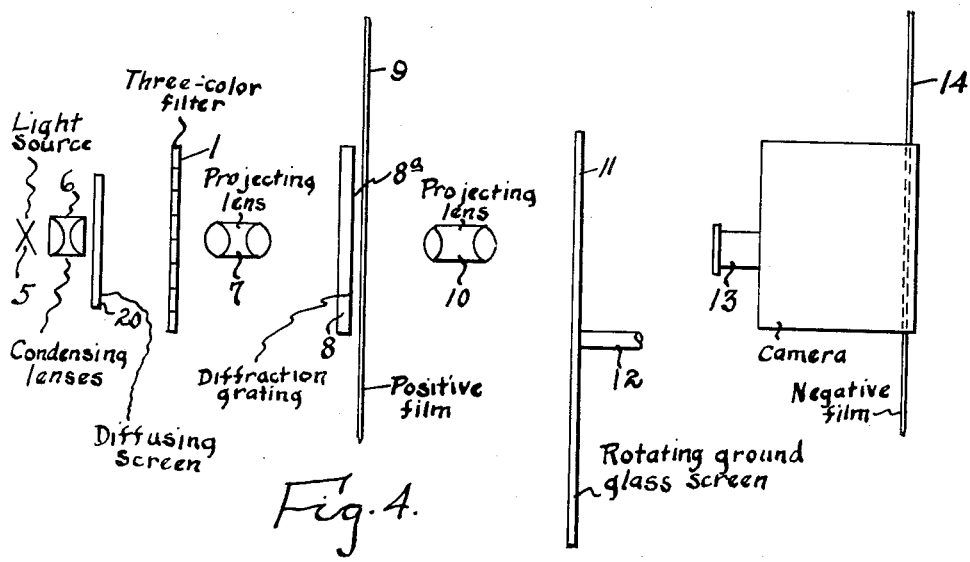
Figure 4 is a diagrammatic view of the apparatus employed in producing a mosaic or screen plate, or multiple emulsion film from the master film.
Figure 5:
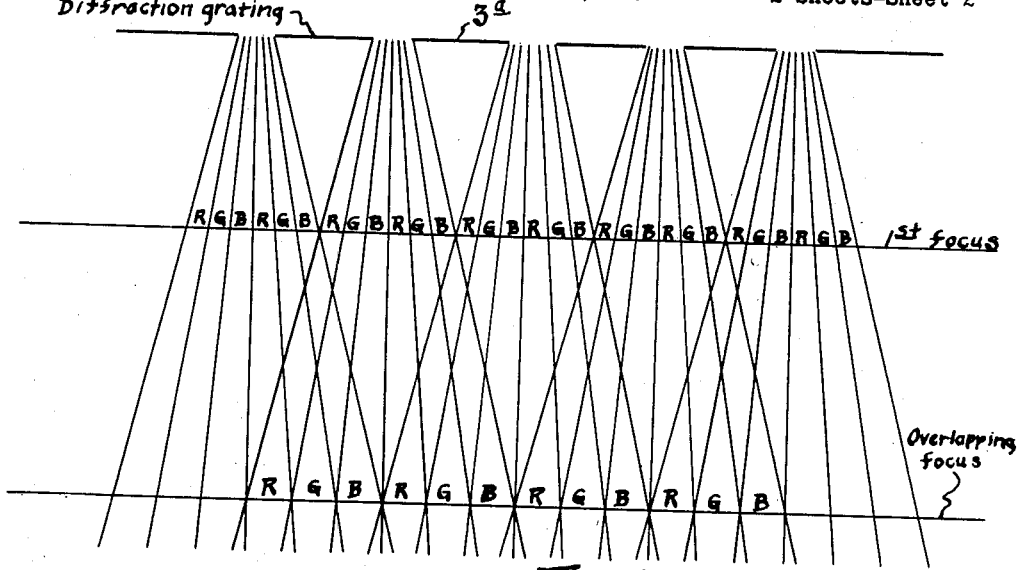
Figure 5 is a diagrammatic view illustrating the manner of light transmission from a six band filter as in Fig. 2, and a diffraction grating illustrating the greater spacing that may be employed between the diffraction grating and the film.

The picture to be photographed is focussed on the film, and the diffraction grating is then placed in position to bring the images of the color filter to a focus on the film. As illustrated in Figs. 4 and 5, the diffraction grating may be so located as to bring the images of the color filter to a focus—indicated as 1st focus—at the plane of the film, or it may be moved away from the film so that the filter images come to an overlapping focus at the film plane, in which case they are respectively two or three times as wide as at the so-called first focus, each series of three color bands being compounded of the light from the two or three series of color bands forming the filter, and therefore having the same total width as the six or nine bands shown at the first focus.

This is further a desirable situation inasmuch as the grating being further removed from the film there is no danger of contact between the two and/or dirt or foreign material collecting between the two.

It will be apparent that each color band being compounded of light from two or three parts, respectively, of the lens, the tendency toward color-fringing when photographing objects which are slightly out of focus which arises from using only one part of the lens for each color, is largely eliminated by this invention.

Figure 1:
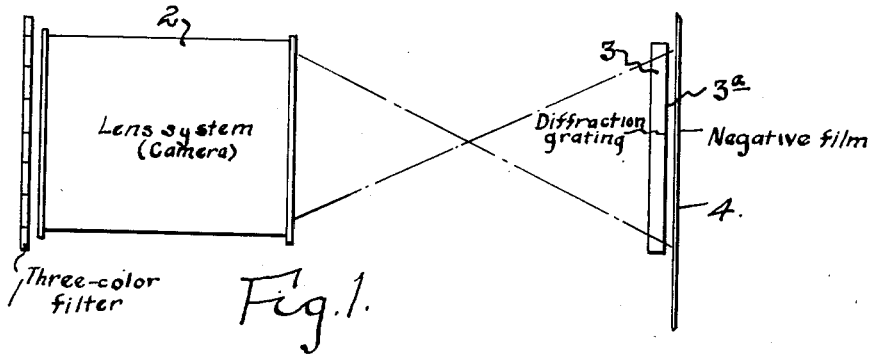
Figure 1 is a diagrammatic view of the apparatus employed in making the original negative in accordance with this invention.

The filter is placed so that its color bands extend similarly to the rulings of the diffraction grating, in this case horizontally as indicated in Fig. 1. Between the lens system 2 and the black and white negative film 4 is placed the diffraction grating. In the case of this invention, the diffraction grating is ruled on the rear face of a piece of optically flat glass 3. The diffraction grating which is indicated in Fig. 1 at 3ª is ruled directly on the back of the glass plate 3 and is formed in accordance with the manner disclosed in the above-mentioned application.

Briefly the grating consists of a series of lines extending horizontally across the rear face of the plate 3 and made by ruling them thereon and filling them in accordance with known practice. The ruled lines are separated by clear lines which are preferably about one-third as wide as the ruled or opaque lines. There are preferably about 600 ruled lines to the inch leaving, of course, 600 clear lines therebetween.

When the black and white negative 4 is exposed through a system, as illustrated in Fig. 1, the film upon development will be found to carry an image of the object photographed. If this image is scrutinized under a microscope it will be found to be made up in the ratio of 1800 to the inch (in the case of a 600 line grating) of linear densities corresponding to the exposure made through the three-color bands of the filter employed. As those in the art are aware, it is advantageous to use a film coated with an emulsion as nearly as possible equally sensitive to the three filter colors although whichever colors are found to be over-exposed may be corrected by partially masking the corresponding filter areas and thus producing a correctly balanced negative. The film is then developed to a negative or by reversal to a positive. In the case of a negative development, an ordinary positive print is then made therefrom.

Those skilled in the art will understand that if such a positive film is placed in a suitable camera, in the exact location occupied by the negative film during exposure, and white light is projected through it, a picture will be thrown upon a suitably placed screen which exactly reproduces the object photographed in the desired color balance, the eye being unable to detect the linear construction of the color, even when greatly enlarged.

An apparatus system for accomplishing this in a simple and practical manner has been illustrated diagrammatically in Fig. 4. A color filter 1, like that of Fig. 2, is placed in front of the lens system 7 of a projection printer. In front of the filter is placed a diffusing screen 20 which, for example, may consist of a plate of milk glass. In front of the diffusing screen is a suitable light source 5 and between the two is placed the usual condensing lens system 6.

On the opposite side of the projection lens system 7 from the filter 1 is a plate of optically flat glass 8 which has a diffraction grating 8ª ruled thereon similar to the grating 3ª employed in taking. At 9 is the master film produced as explained above, the diffraction grating being so positioned with respect to the film as to throw the filter images on the film, the planes of the film and the so-called overlapping filter focus being coincident. Of course all of the advantages explained in connection with the taking of the negative accrue in projection. On the opposite side of the film 9 is a projection lens system 10 which projects the images on the master film onto a ground glass screen 11 which may be stationary and either opaque or translucent, but is preferably mounted so that it may revolve. For this reason a shaft 12 is shown by means of which the ground glass screen may be rotated. The advantages of using a rotating screen of this type have been set forth in the above-mentioned application in detail. On the opposite side of the ground glass screen is placed a camera 13 through which is passed a mosaic or screen-plate film 14. This film may be a multiple emulsion film in accordance with this process instead of a so-called screen plate film. When the negative film 14 has been exposed it is developed and fixed in accordance with well known processes, either to a negative or by reversal to a positive. In the case of negative development positive prints are made therefrom.

The final positive prints produced in accordance with this invention may be projected with ordinary projectors in color on a screen without the necessity of employing additional or special apparatus or attachments.

Figure 6:
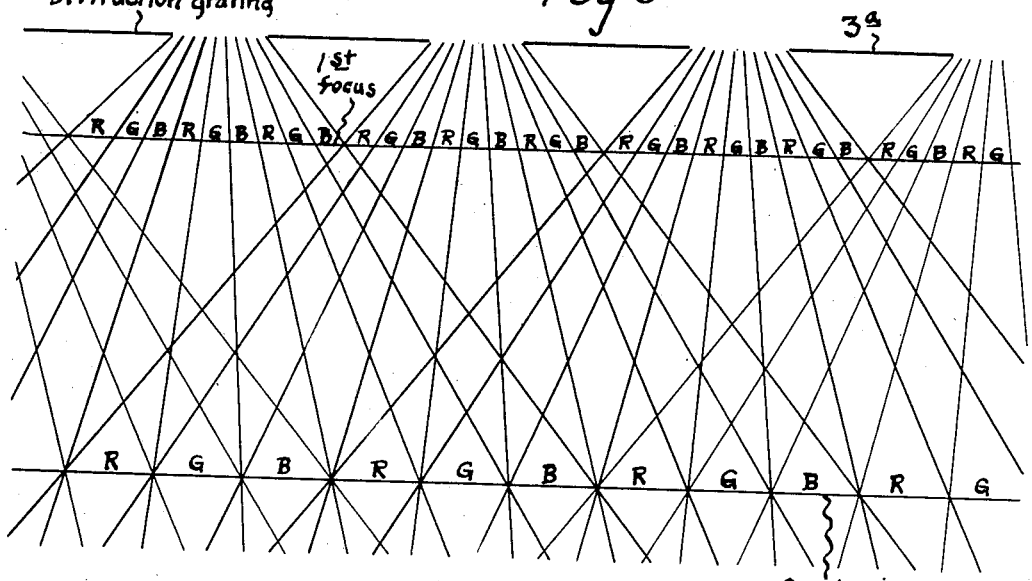
Figure 6 is a similar view employing the nine band filter of Fig. 3.

When desired the filter of Fig. 3 may be employed during taking and printing, in which case each color band is duplicated twice so that the film receives light through three separate parts of the filter when placed in the overlapping focal plane, as clearly indicated in Fig. 6, but a three-series filter may be used to project a picture photographed with a two-series filter, or vice versa. The apparatus and procedure is otherwise the same as that previously described.

From the above description it will be apparent to those skilled in the art that the principles of this invention and the details of construction of the apparatus employed may be varied, as may the processes illustrated, without departure from the novel scope thereof. I do not, therefore, desire to be strictly limited to the description as given for purposes of illustration, but rather to the scope of the appended claims.

What I seek to secure by United States Letters Patent is:

1. A method of making a black and white photographic separation negative of a scene in colors, which comprises exposing a light sensitive layer for production of a black and white negative to the scene through a lens system including a three-color filter in which the colors and sequence thereof are duplicated, and a diffraction grating, the diffration grating being placed with respect to the sensitized layer so as to superimpose on the sensitized layer two or more images of each color arriving through different areas of the lens and spaces of the grating.

2. In color photography the method comprising the steps of exposing a light sensitive panchromatic film to a scene to be photographed in colors through an objective lens of any desired aperture, and a color filter filling said aperture having at least two series of the same color bands, the band in each series being duplicated in the same sequence, and a diffraction grating adjustable in relation to the sensitized film so as to form superimposed images of the color filter thereupon through the slits of the grating, the color images on the film being in the same order as the color bands of the filter whereby the images of the bands of the same color reach the sensitized film from different areas of the lens through different slits of the grating and are superimposed.

3 In an apparatus of the type described the combination with a light sensitive layer, of a taking lens system including a multi-color filter, the colors of the filter and their sequence being duplicated, and a positionable diffraction grating mounted between the lens system and the sensitized layer so that there are superimposed on the sensitized layer two or more images of each color arriving through different areas of the lens and spaces of the grating.

SAMUEL B. GRIMSON.